United States Patent [19]

Bartke

[11] Patent Number: 5,048,479
[45] Date of Patent: Sep. 17, 1991

[54] ELECTRONIC ENGINE CONTROL FOR A MOTOR VEHICLE

[75] Inventor: Ralf-Michael Bartke, Bühl, Fed. Rep. of Germany

[73] Assignee: Robert Bosch GmbH, Stuttgart, Fed. Rep. of Germany

[21] Appl. No.: 563,093

[22] Filed: Aug. 3, 1990

[30] Foreign Application Priority Data

Aug. 4, 1989 [EP] European Pat. Off. ........ 89114452.9

[51] Int. Cl.⁵ .............................................. F02B 77/00
[52] U.S. Cl. .......................... 123/198 D; 123/198 DB
[58] Field of Search ............ 123/198 D, 198 DB, 490, 123/497, 498, 499; 73/118.1, 119 R; 324/418, 422; 340/439

[56] References Cited

U.S. PATENT DOCUMENTS

| 3,470,854 | 10/1969 | Eisele et al. ........................ 123/483 |
| 4,127,887 | 11/1978 | Tanaka et al. ...................... 324/422 |
| 4,305,359 | 12/1981 | Mann et al. .................... 123/198 DB |
| 4,559,914 | 12/1985 | Flaig et al. .................... 123/198 DB |
| 4,648,364 | 3/1987 | Wills ............................. 123/198 DB |
| 4,736,267 | 4/1988 | Karlmann et al. .................. 123/490 |
| 4,764,884 | 8/1988 | Noyori ............................... 324/422 |
| 4,817,418 | 4/1989 | Asami et al. ....................... 73/118.1 |
| 4,905,645 | 3/1990 | Bonse et al. ..................... 123/198 D |

FOREIGN PATENT DOCUMENTS 0326693 8/1989 European Pat. Off. .
2514162 4/1983 France .

Primary Examiner—Noah P. Kamen
Attorney, Agent, or Firm—Walter Ottesen

[57] ABSTRACT

The invention relates to an electronic engine control (EEC) equipped with a fuel cutoff safety device in the form of a relay 12 for controlling the winding of the fuel pump 16. A single conductor (FCOM) connects the fuel pump power supply line with the EEC in order to test and/or monitor the voltage applied across the terminals of the fuel pump, at least when the engine is started up.

9 Claims, 1 Drawing Sheet

ELECTRONIC ENGINE CONTROL FOR A MOTOR VEHICLE

FIELD OF THE INVENTION

This invention relates to an electronic engine control (EEC) for a motor vehicle and more especially to an EEC equipped with a fuel cutoff safety device.

BACKGROUND OF THE INVENTION

A safety device for an EEC for a motor vehicle engine is disclosed in U.S. Pat. No. 4,305,359. In this safety device, the position of the fuel throttle and of the accelerator pedal, and possibly also the condition of an automatic speed controller (ASC) are checked by means of switches connected in the power supply line to a relay which controls energization of the winding of an electric fuel pump.

U.S. Pat. No. 3,470,854 discloses an EEC for a motor vehicle having a safety device wherein the engine speed is monitored and the fuel pump relay is deenergized to stop the fuel pump if the engine speed drops below a predetermined value which can, if desired, be adjustable. However, this function is blocked during starting, and the fuel pump relay is temporarily energized via a switching device. After a predetermined delay, typically about two seconds, the EEC speed-dependent controller (safety device) takes over the energization of the fuel pump relay.

However, when reliance is to be placed on such a safety device when travelling, possibly at high speed, it would be advantageous to be able to check the operational condition of an EEC safety device as aforesaid, prior to making a journey.

SUMMARY OF THE INVENTION

It is an object of the invention to enable a fuel cutoff safety device in an electronic engine control to be tested and/or monitored.

According to the invention, an electronic engine control (EEC) is provided for a motor vehicle equipped with a safety device which stops the electric fuel pump supply in the event of a fault detected by the safety device with the voltage at the terminals of the electric fuel pump being detected and fed back to the EEC.

The invention applies more especially to an EEC of the general kind described in the above-mentioned U.S. Pat. No. 3,470,854 incorporated herein by reference. In this case, the voltage at the terminals of the fuel pump is measured when the engine is started; that is, during the approximate two second delay period which occurs on switching on the ignition before the speed-dependent controller takes over, and if the correct voltage is not detected at the EEC, the speed-dependent controller is prevented from taking over.

The correct test voltage to be detected at the EEC will normally be ground voltage. If ground voltage is not detected, this is indicative of a short circuit, broken electrical contact, jammed or welded relay contact or the like at the fuel pump winding/control relay combination thereby rendering the vehicle unsafe to drive. Alternatively, the EEC can be adapted to activate an alarm device for indicating the fault while still maintaining the on-condition of the fuel pump, so that the vehicle can be driven to the nearest garage. In this way, continuous monitoring of the fuel pump voltage may be made possible to assist in isolating the source of a fault in the EEC safety device which may develop during travel.

The invention as described can be realized with minimal expense simply by the addition of a single conductor connected to the fuel pump power supply circuit and modification of the injection system is not required.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
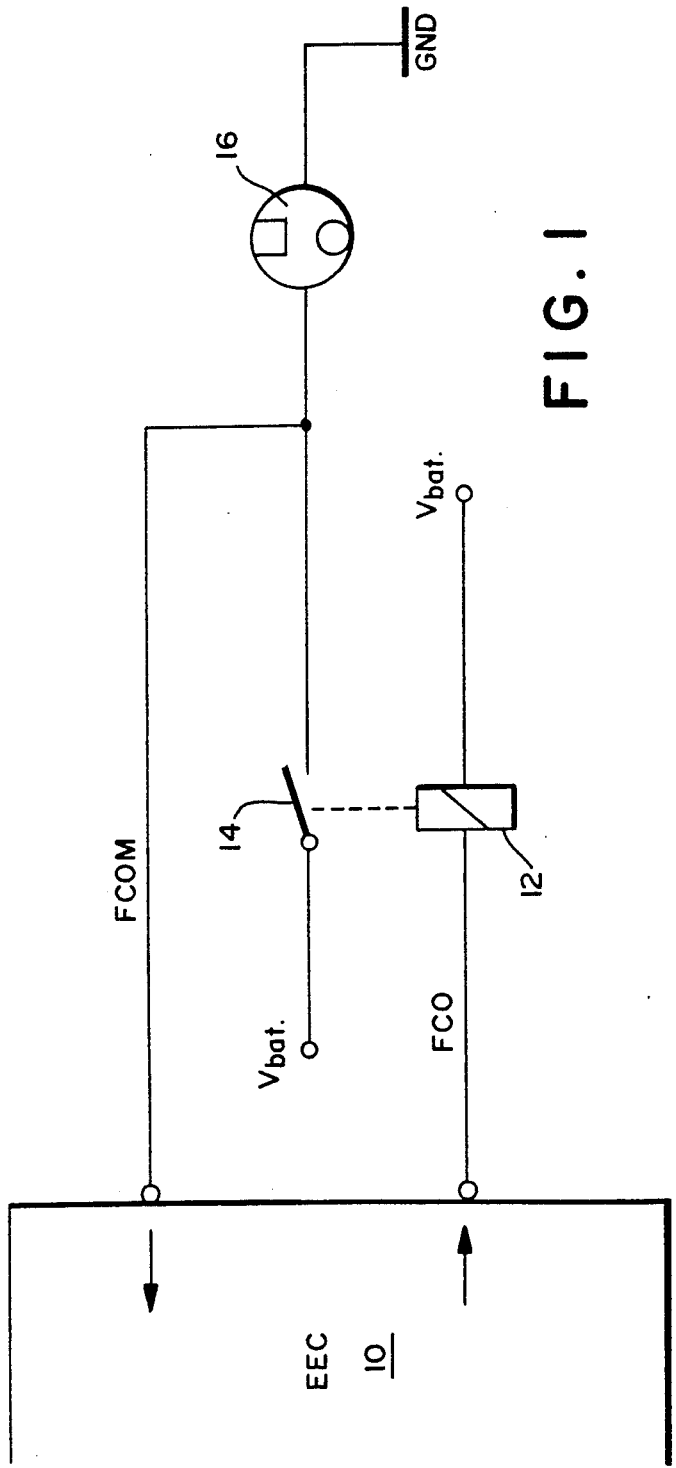
FIG. 1 shows an electronic engine control (EEC) provided with a checkable safety device in accordance with the invention with the arrangement being shown as a simplified circuit diagram; and, FIG. 2 is a voltage timing diagram.

Referring to the drawings, a circuit block 10 is shown which represents an EEC equipped with a fuel cutout safety circuit, for example, in accordance with the device described in U.S. Pat. No. 3,470,854 also incorporated herein by reference.

In an EEC, the throttle is controlled by the accelerator pedal through an electrical transmission which includes position sensors and a servomotor, as well known in the art.

The known EEC circuit comprises switches having operating positions which are dependent on the positions of the throttle and the accelerator pedal. These switches are connected in the power supply circuit to the fuel pump relay and, if not in the correct positions relative to one another, cause deenergization of the fuel pump relay, with consequential stopping of the supply of fuel by the fuel pump, which leads to slowing down and eventual stopping of the engine. In addition, the known EEC circuit includes a safety device which switches off the fuel pump if the rotational speed of the engine drops below a given value. This safety unit is temporarily blocked on ignition, giving a delay of approximately two seconds at which ground voltage should be present at the terminals of the fuel pump winding. In accordance with the invention, if this ground voltage is not detected at the EEC on ignition, the EEC, including in particular the above-mentioned safety device, is prevented from taking over and energizing the fuel pump winding at normal engine speeds, so that the vehicle cannot be driven.

In FIG. 1, the fuel pump relay which serves for fuel cutoff is identified by reference numeral 12, and the line FCO indicates the power line through which energization and deenergization of the relay is controlled. The fuel pump relay 12 has a movable contact 14 in the power supply line to the fuel pump 16. In the absence of an error in the throttle/pedal relationship, the relay 12 is constantly energized during running of the engine, provided also that the engine speed does not fall below a predetermined value. However, in the event of error in the throttle/pedal relationship or a failure in the safety device, the fuel pump relay 12 is deenergized via the FCO line.

Before commencing a journey, it would be advantageous to be able to test the EEC safety circuit, and in accordance with the invention, this is made possible by monitoring the voltage across the fuel pump terminals. In the drawing, the line FCOM indicates the conductor via which the voltage across the fuel pump terminals is fed back to the EEC.

When the ignition switch is first turned to the power-on position, the EEC then immediately carries out a test on the fuel pump 16 and checks the reaction of the relay 12. For this purpose, the EEC causes a voltage to be temporarily applied on the FCO line which should cause a switching off of the pump 16. The reaction of the relay 12 is detected by the EEC by means of a check on the reaction voltage on the FCOM line.

If the reaction voltage does not occur on the FCOM line in a predetermined time period after applying the voltage to switch off the fuel pump 16 via the FCO line, the EEC recognizes a fault condition of the safety means 12 and the engine is prevented from starting.

Figure 2:
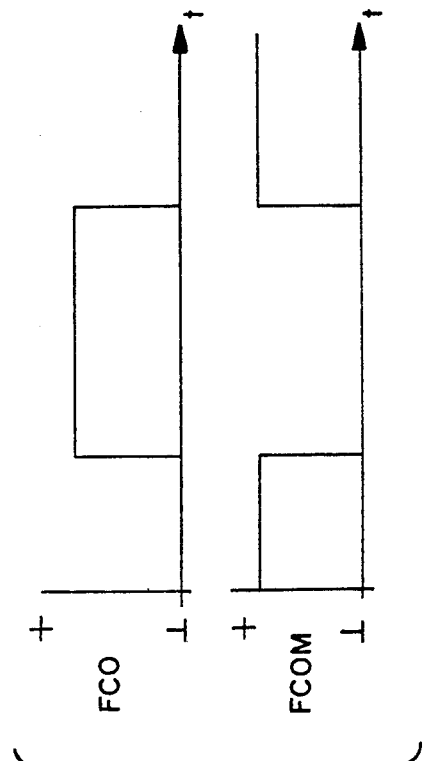

FIG. 2 shows in the upper diagram the voltage charge applied on the FCO line by the EEC, while the lower diagram shows the reaction voltage detected on the FCOM line when the relay is responding correctly and no fault condition exists.

It is understood that the foregoing description is that of the preferred embodiments of the invention and that various changes and modifications may be made thereto without departing from the spirit and scope of the invention as defined in the appended claims.

What is claimed is:

1. In a motor vehicle equipped with an internal combustion engine having an electric fuel pump for supplying fuel to the engine, the fuel pump having terminals for receiving electrical energy for operating the pump, a method for testing a safety device provided for switching off the fuel supply to the engine when there is a fault condition, said safety device including a switching unit switchable for interrupting the supply of electrical energy to the pump, the method comprising the steps of:

supplying the electrical energy from a power supply to said fuel pump at said terminals across which a voltage is present when said electrical energy is supplied and across which a reaction voltage develops when the electrical energy supplied to said terminals is interrupted;

causing an electronic engine control unit to simulate a fault condition by applying a drive signal to said switching unit for switching said switching unit to interrupt the electrical energy to said terminals; and, transmitting said reaction voltage to said electronic control unit thereby indicating proper operation of said switching unit or a malfunction of said switching unit when said reaction voltage is not transmitted to said electronic engine control unit in response to said drive signal applied to said switching unit.

2. The method of claim 1, wherein said drive signal is a voltage applied temporarily to said switching unit and said reaction voltage across said terminals is detected and the reaction of said switching unit is correct when the reaction voltage occurs in a predetermined time period after applying said drive signal.

3. The method of claim 1, wherein said drive signal is generated during the start of the engine, before commencing a journey.

4. The method of claim 1, wherein said drive signal is generated for a time period, which is not longer than about 2 seconds.

5. In a motor vehicle equipped with an internal combustion engine having a fuel pump for supplying fuel to the engine, an arrangement for testing a safety device for switching off the fuel supply to the engine when there is a fault condition, the arrangement comprising:

said fuel pump being an electric fuel pump for pumping the fuel to the engine and having terminals for receiving electrical energy for operating the fuel pump;

power supply means for supplying the electrical energy to said fuel pump at said terminals across which a voltage is present when said electrical energy is supplied and across which a reaction voltage develops when the electrical energy supplied to said terminals is interrupted;

said safety device including switching means switchable between a first condition wherein said terminals are connected to said power supply means and a second condition wherein the supply of electrical energy to said terminals is interrupted producing said reaction voltage;

an electronic engine control unit for simulating a fault condition by applying a drive signal to said switching means for switching said switching means into said second condition; and circuit means for transmitting said reaction voltage to said electronic engine control unit thereby indicating proper operation of said switching means or a malfunction of said switching means when said reaction voltage is not transmitted to said control unit when said drive signal is applied to said switching means.

6. The arrangement of claim 5, said circuit means including a single conductor connecting at least one of said terminals to said electronic engine control unit.

7. The arrangement of claim 5, said switching means being a relay having electrical contacts for applying and interrupting the flow of said electrical energy to said terminals of said electric fuel pump.

8. An electronic engine control (EEC) arrangement for a motor vehicle equipped with an internal combustion engine, the arrangement comprising:

an electronic engine control unit;

an electric fuel pump for pumping fuel to the engine and having terminals for receiving electrical energy for operating the fuel pump;

power supply means for supplying the electrical energy to said fuel pump at said terminals across which a voltage is present when said electrical energy is supplied;

safety means for detecting a fault and cutting off said electrical energy to said fuel pump in response to said fault;

detecting means for detecting said voltage at said terminals and feeding the same back to said electronic engine control unit; and, the electronic engine control unit having a speed-dependent safety device which is blocked during ignition, the voltage being detected on an ignition and, if a correct voltage is not detected, the electronic engine control being prevented from taking over control of the pump.

9. A method for controlling and monitoring an internal combustion engine of a motor vehicle, by an electronic engine control system equipped with safety means for cutting off the fuel supply in the event of a fault, the method comprising the steps of:

generating temporarily a signal for activating said safety means;

detecting whether said safety means reacts correctly with said safety means cutting off the power supply of a fuel pump in the event of the fault with a reaction voltage developing when said power supply thereto is cut off; and, the reaction voltage, detected by the electronic control system, being the voltage of the fuel pump of the motor vehicle.

* * * * *